A. GARTNER.
Hackling Machine.

No. 63,499.

Patented April 2, 1867.

Witnesses:

Inventor:
Arnold Gartner
Per
attorney

United States Patent Office.

ARNOLD GÄRTNER, OF NEW YORK, N. Y., ASSIGNOR TO HIMSELF AND M. O. LUTTGEN, OF SAME PLACE.

*Letters Patent No. 63,499, dated April 2, 1867.*

IMPROVEMENT IN MACHINE FOR CLEANING FLAX AND HEMP.

The Schedule referred to in these Letters Patent and making part of the same.

TO ALL WHOM IT MAY CONCERN:

Be it known that I, ARNOLD GÄRTNER, of the city, county, and State of New York, have invented a new and improved Machine for Cleaning Flax and Hemp; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a flax or hemp brake composed of a drum provided with a series of beaters and flyers which are arranged in lines at suitable distances apart. The flyers are rigidly secured to the periphery of the drum, but the beaters are hung on gudgeons so that they are yielding, whereby injury to the fibres is prevented. The flax or hemp is fed to the machine over curved adjustable aprons which extend downwards so that the dust and dirt are carried down.

Figure 2:
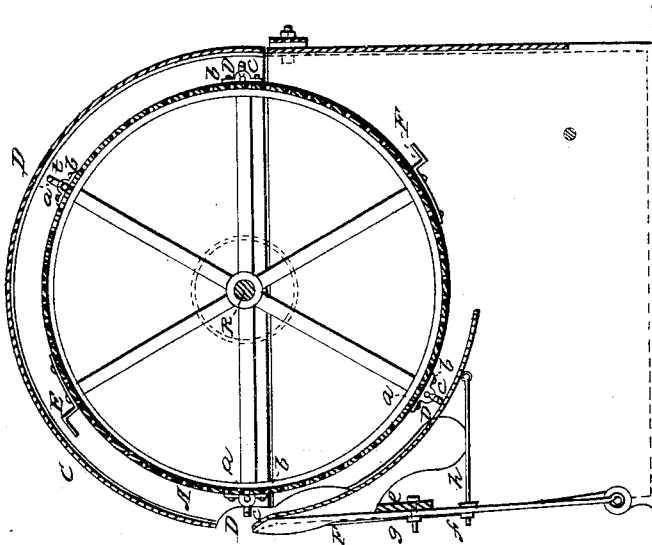
Figure 2 is a transverse section of the same.
Figure 3:
Figure 3 is a detached elevation of one of the beaters.
Figure 1:
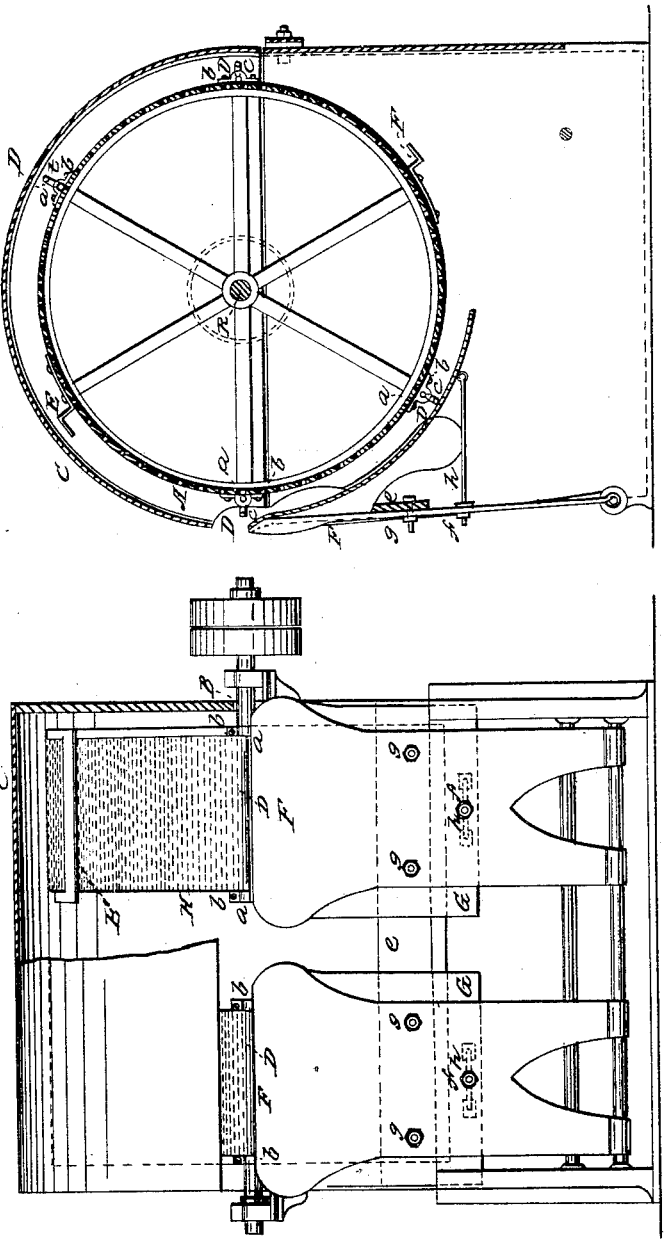
Figure 1 represents a sectional side elevation of this invention.

A represents a drum which is hollow and made of sheet metal or any other suitable material, and may be perforated with a large number of holes. This drum is mounted on a shaft, B, to which a rapid revolving motion is imparted by belt and pulley or by any suitable means. The upper part of said drum is covered up by a semicircular cap, C, and to the circumference of the drum is secured a series of beaters, D, and flyers, E. The flyers are rigidly attached to the drum, and they consist of strips of sheet metal or any other suitable material, bent twice at right angles, as shown in fig. 2 of the drawing, and they are secured to the periphery of the drum by rivets, bolts, or any suitable means. The beaters D are made in the form shown in fig. 3. They are provided with gudgeons, $a$, which work in suitable boxes, $b$, attached to the circumference of the drum, and they are provided with lips, $c$, which project over the boxes and confine their oscillating motion within certain limits. As the drum revolves the beaters place themselves in a radial position by the action of the centrifugal force, and as the same strike the flax or hemp they yield slightly and injury to the fibres is avoided. The flax or other material is placed on rests F, which are hinged to a rod, H, secured in the lower part of the frame A. Said rests are secured to a cross-bar, $e$, by screws, $g$, or other suitable means, so that the distance of their upper edges from the circumference of the drum can be regulated at will, and from the upper edges of said rests extend the aprons G, which curve down under the drum, as shown in fig. 2. The lower edges of these aprons are supported by forked rods, $h$, and they are made adjustable towards and from the drum by screws and nuts. The flax or hemp to be cleaned is divided into a number of suitable bunches which are exposed to the action of the beaters and flyers by pushing them gradually over the rests towards the drum. When finished from one end to the middle the bunches are turned round and the other ends are finished in the same manner. The drum being turned towards the operator, causes the dust and impurities to pass down under the drum, and by perforating said drum the current of air created by the same is materially reduced and the operator is not exposed to any inconvenience from dust or dirt. By making the beaters yielding to a certain extent, injury to the fibres is avoided, particularly if the flax or hemp is hard, and the cleaning of the fibres is facilitated by the combined use of the yielding beaters and rigid flyers.

What I claim as new, and desire to secure by Letters Patent, is—

1. The drum A, provided with yielding beaters D and rigid flyers E, in combination with the adjustable curved aprons G, extending from the rests F, substantially as and for the purpose set forth.

2. The lips $c$, extending from the ends of the beaters D, over the boxes $b$, substantially as and for the purpose described.

ARNOLD GÄRTNER.

Witnesses:
WM. F. MCNAMARA,
ALEX. F. ROBERTS.